United States Patent Office 3,763,172
Patented Oct. 2, 1973

3,763,172
ALKOXY DERIVATIVES OF PYRAZOLOPYRIDINE CARBOXYLIC ACIDS AND ESTERS
Theodor Denzel, Nurnberg, and Hans Hoehn, Tegernheim, Germany, assignors to E. R. Squibb & Sons, Inc., Princeton, N.J.
No Drawing. Filed Jan. 12, 1972, Ser. No. 217,295
Int. Cl. C07d 31/36
U.S. Cl. 260—295.5 B                    5 Claims

ABSTRACT OF THE DISCLOSURE

New alkoxy derivatives of pyrazolo[4,3-c]pyridine-7-carboxylic acids and esters have the general formula

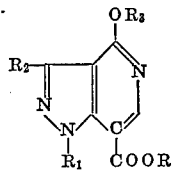

They are useful as ataractic agents. In addition, the new compounds increase the intracellular concentration of adenosine-3′,5′-cyclic monophosphate.

SUMMARY OF THE INVENTION

This invention relates to new alkoxy derivatives of pyrazolo[4,3-c]pyridine-7-carboxylic acids, their esters and salts of these compounds as well as processes for producing them. These new compounds have the Formula (I)

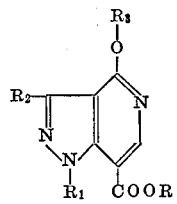

The symbols have the following meanings in Formula I and throughout this specification. R is hydrogen or alkyl up to 12 carbon atoms, $R_1$ is hydrogen, lower alkyl, benzoyl, substituted benzoyl, phenyl or phenyl-lower alkyl. $R_2$ is hydrogen, lower alkyl, phenyl or phenyl-lower alkyl. $R_3$ is lower alkyl or phenyl-lower alkyl.

Especially preferred compounds of Formula I are those wherein R is hydrogen or lower alkyl, especially ethyl, $R_1$ is hydrogen, ethyl, $R_2$ is methyl, $R_3$ is ethyl, propyl or butyl.

DETAILED DESCRIPTION

In Formula I, the alkyl groups represented by R are straight or branched saturated hydrocarbon groups of up to 12 carbons. Preferred, however, are the lower alkyl groups of up to seven carbon atoms such as methyl, ethyl, propyl, isopropyl, butyl, isobutyl, t-butyl, amyl and the like.

Similar lower alkyl groups are represented by $R_1$, $R_2$ and also are part of the phenyl-lower alkyl substituents. The substituted benzoyl groups include phenyl rings bearing one or two substituents. Thus $R_1$ represents $R_4$, $R_5$-benzoyl wherein $R_4$ and $R_5$ each is hydrogen, halogen, especially chlorine or bromine, lower alkyl or lower alkoxy, including benzoyl, chlorobenzoyl, e.g., o-, m- or p-chlorobenzoyl, bromobenzoyl, e.g., o-, m- or p-bromobenzoyl, o-, m- or p-toluoyl, 2,5-dichlorobenzoyl, 3,5-dimethylbenzoyl, 3,4-dimethoxybenzoyl and the like. Unsubstituted and monosubstituted benzoyl are preferred.

The new compounds of Formula I are produced by the following method.

A 5-aminoisoxazole of the formula (II) 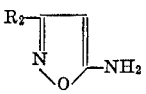

[produced by reacting 3 - iminobutyronitrile with hydroxylamine by the procedure described in Ann. Chem. 624, 22 (1959)] is made to react with an alkoxymethylene malonic acid ester of the formula (III) 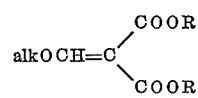

wherein R is alkyl, by heating at a temperature of about 120° C.

The resulting compound of the formula (IV) 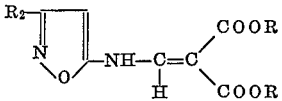

is cyclized in an inert organic solvent, while distilling off the alcohol formed, producing a compound of the formula (C) 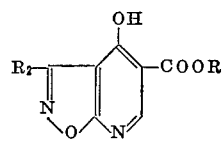

This is then alkylated by treatment with an alkyl halide in an inert organic solvent like dimethylformamide in the presence of an alkali metal carbonate to obtain a compound of the formula (VI) 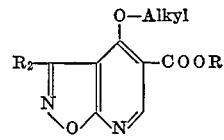

The 4-hydroxy compound of Formula V, instead of being alkylated, may be refluxed for several hours with a phosphorus halide like phosphorus oxychloride to obtain the intermediate of the formula (VII) 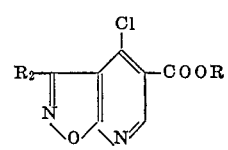

Alternatively, instead of cyclizing the malonic acid ethyl ester compound of Formula IV in an inert organic solvent at about 230° to 260° C., this product also undergoes cyclization by means of phosphorus oxychloride producing directly the intermediate of Formula VII.

The intermediate of Formula VI or of Formula VII is then made to react with a primary or secondary amine

e.g., wherein $R_6$ is hydrogen or lower alkyl, and $R_7$ is lower alkyl. Butylamine is preferred.

This reaction yields a compound of the formula (VIII) 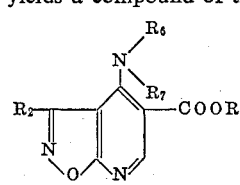

The compound of Formula VIII is then hydrogenated with a catalyst like palladium on charcoal in an organic solvent like acetic acid to form a compound of the formula (IX)

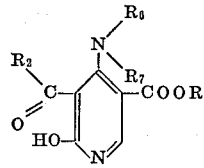

Treatment of the compound of Formula IX with hydrazine or hydrazine hydrate yields a compound of the formula (X)

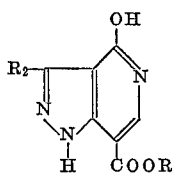

which may then be alkylated with about one equivalent of a lower alkyl halide or phenyl-lower alkyl halide $R_3$-X (X is a halogen, preferably iodine) in an inert organic solvent in the presence of an alkali metal carbonate producing a compound of Formula I.

Products of Formula I in which $R_1$ is other than hydrogen are produced from compounds of Formula I ($R_1$=H) by alkylating with an additional equivalent of an alkyl halide in the presence of an alkali metal carbonate.

Products of Formula I in which R is hydrogen are produced from the esters by hydrolysis of the latter, e.g., with a base like sodium hydroxide. The compounds of Formula I form salts which are also part of this invention. The salts include acid-addition salts, particularly the non-toxic, physiologically acceptable members. The bases of Formula I form salts by reaction with a variety of organic acids providing acid addition salts including, for example, hydrohalides (especially hydrochloride and hydrobromide), sulfate, nitrate, borate, phosphate, oxalate, tartrate, malate, citrate, acetate, ascorbate, succinate, benzenesulfonate, methanesulfonate, cyclohexanesulfonate and toluenesulfonate. The acid addition salts frequently provide a convenient means for isolating the product, e.g., by forming and precipitating the salt in an appropriate menstruum in which the salt is insoluble, then after separation of the salt, neutralizing with a base such as barium hydroxide or sodium hydroxide, to obtain the free base of Formula I. Other salts may then be formed from the free base by reaction with an equivalent of acid.

The new compounds of this invention are central nervous system depressants and may be used as tranquilizers or ataractic agents for the relief of anxiety and tension states, for example, in mice, cats, rats, dogs and other mammalian species, in the same manner as chlordiazepoxide. For this purpose a compound or mixture of compounds of Formula I, or non-toxic, physiologically acceptable acid addition salt thereof, may be administered orally or parenterally in a conventional dosage form such as tablet, capsule, injectable or the like. A single dose, or preferably 2 to 4 divided daily doses, provided on a basis of about 1 to 50 mg. per kilogram per day, preferably about 2 to 15 mg. per kilogram per day, is appropriate. These may be conventionally formulated in an oral or parenteral dosage form by compounding about 10 to 250 mg. per unit of dosage with conventional vehicle, excipient, binder, preservative, stabilizer, flavor or the like as called for by accepted pharmaceutical practice.

The new compounds also increase the intracellular concentration of adenosine-3′,5′-cyclic monophosphate, and thus by the administration of about 10 to 50 mg./kg., in single or two to four divided doses in conventional oral or parenteral dosage forms such as those described above may be used to alleviate the symptoms of asthma.

The following examples are illustrative of the invention. All temperatures are on the centigrade scale.

EXAMPLE 1

4-ethoxy-3-methylpyrazo-[4,3-c]pyridine-7-carboxylic acid ethyl ester (a) [[(3 - methyl - 5 - isoxazolyl)amino]methylene] malonic acid diethyl ester: 112.5 g. of 3-methyl-5-aminoisoxazole (1.14 mol.) and 248 g. of ethoxymethylene malonic acid diethyl ester (1.14 mol.) are heated with stirring for 45 minutes at 130°. After this period, ethanol is removed under reduced pressure. The residue solidifies on cooling and is recrystallized from ethanol, M.P. 134–136°, yield 245 g. (80%).

(b) 4 - hydroxy - 3 - methylisoxazolo[3,4-b]pyridine-5-carboxylic acid ethyl ester: 50 g. of [[3-methyl-5-isoxazolyl)amino]methylene]malonic acid diethyl ester (0.19 mol.) are quickly added to 250 ml. of vigorously refluxing diphenyl ether. After 7 minutes, the reaction mixture is cooled rapidly. The solvent is distilled off in vacuo and the oily residue crystallizes after adding 100 ml. of methanol. Recrystallization from methanol yields 20 g. (48%) of 4 - hydroxy - 3 - methylisoxazolo[3,4-b]pyridine-5-carboxylic acid ethyl ester, M.P. 150–152°.

(c) 4 - ethoxy - 3-methylsioxazolo[3,4-b]pyridine-5-carboxylic acid ethyl ester: 22.2 g. of 4-hydroxy-3-methylisoxazolo[3,4-b]pyridine-5-carboxylic acid ethyl ester (0.1 mol.) are dissolved in 150 ml. of ethanol and 28 g. of potassium carbonate (0.2 mol.). 31 g. of ethyl iodide (0.2 mol.) are added. The mixture is heated with stirring for 6 hours. The hot solution is filtered and the solvent evaporated. The oily residue yields on crystallization with methanol 18.2 g. of 4-ethoxy-3-methyl-isoxazolo[3,4-b]pyridine-5-carboxylic acid ethyl ester (73%), M.P. 62°.

(d) 4 - butylamino - 3-methylisoxazolo[3,4-b]pyridine-5-carboxylic acid ethyl ester: 25 g. of 4-ethoxy-3-methylisoxazolo[3,4-b]pyridine - 5 - carboxylic acid ethyl ester (0.113 mol.) are dissolved in 100 ml. of benzene and after adding 8 g. of butylamine (0.23 mol.), the solution is refluxed for 12 hours. The solvent is distilled off and the residual 4 - butylamino-3-methylisoxazolo[3,4-b]pyridine-5-carboxylic acid ethyl ester is recrystallized from ligroin, M.P. 60°, yield 23.5 g. (85%).

(e) 3 - acetyl - 4-butylamino-2-hydroxypyridine-5-carboxylic acid ethyl ester: 300 g. of 4-butylamino-3-methylisoxazolo[3,4-b]pyridine - 5 - carboxylic acid ethyl ester (1.08 mol.) are dissolved in 0.5 liter of acetic acid, 1 g. of palladium on charcoal is added and the mixture is hydrogenated. After absorption of 24 liters of hydrogen, the reaction is stopped, the catalyst is filtered off and the solvent removed in vacuo. The residue is treated for 7 hours at 100° with 0.5 liter of water with stirring. The reaction mixture is cooled and extracted 3 times with 200 ml. portions of chloroform. The organic layers are collected, dried over sodium sulfate and evaporated to dryness. Recrystallization of the oily residue yields 216 g. of 3 - acetyl-4-butylamino-2-hydroxypyridine-5-carboxylic acid ethyl ester (72%), M.P. 134–136°.

(f) 4 - hydroxy - 3-methyl-1H-pyrazolo[4,3-c]pyridine-7-carboxylic acid ethyl ester: 8.4 g. of 3-acetyl-4-butylamino - 2 - hydroxypyridine-5-carboxylic acid ethyl ester (0.03 mol.) are dissolved in 20 ml. of acetic acid, 3 ml. of hydrazine hydrate are added and the mixture is refluxed for 5 hours. After this time, the solvent is removed in vacuo and the crystalline precipitate for 4-hydroxy-3-methyl - 1H - pyrazolo[4,3-c]pyridine-7-carboxylic acid ethyl ester is recrystallized from acetic acid, yield 5.1 g. (77%), M.P. >310°.

(g) 4 - ethoxy - 3 - methyl - 1H - pyrazolo[4,3-c]pyridine-7-carboxylic acid ethyl ester: 2.2 g. 4-hydroxy-3-methyl - 1H - pyrazolo[4,3-c]pyridine-7-carboxylic acid ethyl ester (0.01 mol.) 2.8 g. of potassium carbonate, (0.02 mol.) and 1.6 g. of ethyl iodide are suspended in 50 ml. of dimethylformamide and heated for 10 hours at 70°. After this time 30 ml. of water are added. 4-ethoxy-3-methyl - 1H - pyrazolo[4,3-c]pyridine-7-carboxylic acid ethyl ester precipitates, is filtered and recrystallized from methanol, yield 1.9 g. (76%), M.P. 200°. The hydrochloride is formed by treatment with ethanolic hydrogen chloride.

(h) 4 - ethoxy - 1 - ethyl-3-methyl-1H-pyrazolo[4,3-c]pyridine-7-carboxylic acid ethyl ester and free acid: By repeating the procedure of part (g) with an additional 1.6 g. of ethyl iodide, 4-ethoxy-1-ethyl-3-methyl-1H-pyrazolo[4,3-c]pyridine-7-carboxylic acid ethyl ester is obtained. Hydrolysis of this product with aqueous sodium hydroxide yields the free acid (R=H).

The additional compounds in the last column of the following table are obtained by the procedure of Example 1 by substituting for the 3-methyl-5-aminoisoxazole in part (a) the 5-aminoisoxazole in the first column, substituting for the ethyl iodide in part (g) the halide indicated in the second column and substituting for the ethyl iodide in part (h) the halide indicated in the third column. The free acid (R=H) may then be obtained in each instance by hydrolysis with aqueous sodium hydroxide.

| Example | R₂ | R₃X (R₃) | R₁X (R₁) | R | R₁X (R₁) | R₂ | R₃ |
|---|---|---|---|---|---|---|---|
| 2 | CH₃ | C₂H₅ | H | C₂H₅ | H | CH₃ | C₂H₅ |
| 3 | C₆H₅ | CH₃ | CH₃ | CH₃ | CH₃ | C₆H₅ | CH₃ |
| 4 | H | C₂H₅ | 4-CO-C₆H₄ | C₆H₁₃ | 4-CO-C₆H₄ | H | C₂H₅ |
| 5 | C₂H₅ | C₂H₅ | C₆H₅ | C₁₂H₂₅ | C₆H₅ | C₂H₅ | C₂H₅ |
| 6 | CH₂-C₆H₅ | C₂H₅ | CH₂-C₆H₅ | C₂H₅ | CH₂-C₆H₅ | CH₂-C₆H₅ | C₂H₅ |
| 7 | H | C₂H₅ | C₂H₅ | C₂H₅ | C₂H₅ | H | C₂H₅ |
| 8 | CH₃ | CH₃ | 4-Cl-C₆H₄-CO- | C₂H₅ | 4-Cl-C₆H₄-CO- | CH₃ | CH₃ |
| 9 | CH₂-C₆H₅ | C₂H₅ | CH₃-C₆H₄-CO- | C₂H₅ | CH₃-C₆H₄-CO- | CH₂-C₆H₅ | C₂H₅ |
| 10 | H | C₂H₅ | 3,5-Br₂-C₆H₃-CO- | C₂H₅ | 3,5-Br₂-C₆H₃-CO- | H | C₂H₅ |
| 11 | H | C₂H₅ | CH₃ | i-C₃H₇ | CH₃ | H | C₂H₅ |
| 12 | H | C₂H₅ | H | C₁₀H₂₁ | H | H | C₂H₅ |

What is claimed is:
1. A compound of the formula

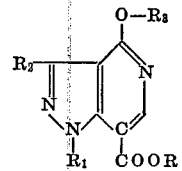

wherein R is hydrogen or alkyl of up to 12 carbon atoms, $R_1$ is hydrogen, lower alkyl, meta- or para- $R_4$, $R_5$-benzoyl, phenyl, benzyl or phenethyl, $R_2$ is hydrogen, lower alkyl, phenyl, benzyl or phenethyl, $R_3$ is lower alkyl, benzyl or phenethyl, $R_4$ and $R_5$ each is hydrogen, halogen, methyl or methoxy, and physiologically acceptable acid addition salts thereof.

2. A compound as in claim 1 wherein R, $R_2$ and $R_3$ each is lower alkyl and $R_1$ is hydrogen.

3. A compound as in claim 1 wherein R and $R_3$ each is ethyl, $R_2$ is methyl and $R_1$ is hydrogen.

4. A compound as in claim 1 wherein R, $R_1$, $R_2$ and $R_3$ each is lower alkyl.

5. A compound as in claim 1 wherein R and $R_3$ each is ethyl, $R_1$ is ethyl, and $R_2$ is methyl.

References Cited
UNITED STATES PATENTS
3,669,950  6/1972  Hoehn et al. ____ 260—295.5 B OTHER REFERENCES
Roberts et al., Basic Principles of Organic Chemistry, Benjamin Publishers, Page 806, 1965 QD 251 R 58 C.6

ALAN L. ROTMAN, Primary Examiner

U.S. Cl. X.R.
260—295.5 R, 294.8 R; 424—266